US010413859B2

(12) United States Patent
Le Bot et al.

(10) Patent No.: US 10,413,859 B2
(45) Date of Patent: Sep. 17, 2019

(54) ADSORBER WITH ROTARY DRYER

(71) Applicant: L'Air Liquide, Société Anonyme pour l'Etude et l'Exploitation des Procédés Georges Claude, Paris (FR)

(72) Inventors: Patrick Le Bot, Vincennes (FR); Maxime Perez, Jouy en Josas (FR); Guillaume Rodrigues, Le Plessis Trevise (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 91 days.

(21) Appl. No.: 15/500,832

(22) PCT Filed: Jul. 20, 2015

(86) PCT No.: PCT/FR2015/051992
§ 371 (c)(1),
(2) Date: Jan. 31, 2017

(87) PCT Pub. No.: WO2016/016543
PCT Pub. Date: Feb. 4, 2016

(65) Prior Publication Data
US 2017/0216760 A1 Aug. 3, 2017

(30) Foreign Application Priority Data

Aug. 1, 2014 (FR) .................................... 14 57481

(51) Int. Cl.
*B01D 53/047* (2006.01)
*B01D 53/06* (2006.01)
(Continued)

(52) U.S. Cl.
CPC .......... *B01D 53/047* (2013.01); *B01D 51/10* (2013.01); *B01D 53/02* (2013.01);
(Continued)

(58) Field of Classification Search
CPC ............ C01B 13/0262; C01B 13/0266; C01B 13/027; B01D 51/10; B01D 53/02;
(Continued)

(56) References Cited

U.S. PATENT DOCUMENTS 6,152,992 A * 11/2000 Gemmingen ...... B01D 53/0431
95/96
8,764,882 B2 * 7/2014 Kametani ............. B01D 53/06
95/113

(Continued)

FOREIGN PATENT DOCUMENTS

| EP | 1 103 525 | 5/2001 |
| WO | WO 99 43418 | 9/1999 |
| WO | WO 00 76631 | 12/2000 |

OTHER PUBLICATIONS

International Search Report and Written Opinion for corresponding PCT/FR2015/051992, dated Nov. 17, 2015.

*Primary Examiner* — Frank M Lawrence, Jr.
(74) *Attorney, Agent, or Firm* — Elwood L. Haynes

(57) ABSTRACT

A (V)PSA unit for purifying a gas stream by adsorption is provided. The (V)PSA unit comprises, arranged successively in the direction of flow of the feed gas stream, a rotary-structured adsorbent wheel configured so as to drive the gas stream therethrough in an axial manner and allowing the feed gas to dry to a level corresponding to a dew point below −30 C., and an adsorber with a centripetal radial configuration, comprising a bed of particulate adsorbent.

13 Claims, 5 Drawing Sheets

(51) Int. Cl.
  *B01D 51/10* (2006.01)
  *B01D 53/04* (2006.01)
  *B01D 53/26* (2006.01)
  *C01B 13/02* (2006.01)
  *B01D 53/02* (2006.01)

(52) U.S. Cl.
  CPC ..... *B01D 53/0431* (2013.01); *B01D 53/0476* (2013.01); *B01D 53/06* (2013.01); *B01D 53/261* (2013.01); *C01B 13/027* (2013.01); *C01B 13/0262* (2013.01); *C01B 13/0266* (2013.01); *B01D 53/04* (2013.01); *B01D 2253/104* (2013.01); *B01D 2253/106* (2013.01); *B01D 2253/108* (2013.01); *B01D 2253/1085* (2013.01); *B01D 2253/204* (2013.01); *B01D 2256/10* (2013.01); *B01D 2256/12* (2013.01); *B01D 2257/102* (2013.01); *B01D 2259/40001* (2013.01); *B01D 2259/414* (2013.01)

(58) Field of Classification Search
  CPC .. B01D 53/04; B01D 53/047; B01D 53/0431; B01D 53/0476; B01D 53/06; B01D 53/261; B01D 2253/104; B01D 2253/106; B01D 2253/108; B01D 2253/1085; B01D 2253/204; B01D 2256/10; B01D 2256/12; B01D 2257/102; B01D 2259/40001; B01D 2259/414
  USPC ......... 95/96–98, 113, 117, 122; 96/125, 132
  See application file for complete search history.

(56) References Cited

U.S. PATENT DOCUMENTS

| | | | |
|---|---|---|---|
| 9,314,731 B2 * | 4/2016 | Chen | B01D 53/0462 |
| 2005/0217481 A1 | 10/2005 | Dunne et al. | |
| 2009/0025554 A1 * | 1/2009 | Tahara | B01D 53/04 95/99 |
| 2012/0079938 A1 * | 4/2012 | Celik | B01D 53/0431 95/95 |

* cited by examiner

ADSORBER WITH ROTARY DRYER

CROSS REFERENCE TO RELATED APPLICATIONS

This application is a 371 of International PCT Application PCT/FR2015/051992, filed Jul. 20, 2015 which claims priority to French Patent Application No. 1457481 filed Aug. 1, 2014, the entire contents of which are incorporated herein by reference.

BACKGROUND

The present invention relates to an adsorption purification unit comprising the combination of a regenerative component comprising structured adsorbents and of an adsorber filled with a particulate adsorbent.

When gases are to be produced, separated or purified, use may be made of adsorption processes. Use is generally made of several adsorbers filled with adsorbent materials that are selective with respect to at least one of the constituents of the feed stream. There are two main adsorber technologies, one being axial bed adsorbers and the other radial bed adsorbers. In the first case, the gas circulates vertically through an adsorbent bed, in the second case the gas circulates radially, either from the inside toward the outside (relative to the adsorption phase) in centrifugal configuration, or from the outside towards the inside in centripetal configuration.

Within the context of the invention, mention will respectively be made of PSA (pressure swing adsorption), VSA (vacuum swing adsorption) and (V)PSA denoting one or other of the 2 units but also a combination of the 2.

The axial technology is not very expensive but when high flow rates are treated the pressure drops and the problems of attrition become limiting. Thus, starting from a certain flow rate to be treated, one solution consists in changing to radial geometry that results in a limitation of the pressure drops without an increase in the radius of the adsorber. Specifically, the radial adsorber offers an increased flow area for a given volume of adsorber and is not theoretically subject to a limitation with respect to the attrition phenomena. The bed of adsorbent may be suspended between vertical perforated grids suspended by the top. The best-known drawbacks of this radial technology are an increase in the dead volumes and a high manufacturing cost.

Nevertheless, another drawback linked to this radial technology appears when one of the beds is of smaller size compared to the others.

For example, a PSA or TSA adsorption process will be considered comprising two types of adsorbents (A and B) requiring passage of the gas through A before B in the adsorption phase and for which the amount of adsorbent B needed is very large relative to the amount A. Since the adsorber comprises 2 beds, 3 grids are generally used to hold the particulate materials. In centripetal radial configuration, the material A is located between the "outer" grid and the "intermediate" grid whereas the material B is held between the same intermediate grid and the "inner" grid. This A/B disproportion then accentuates, on the one hand, the difficulties in constructing said radial adsorber since the diameters of the outer and intermediate grids are similar, and consequently makes it difficult to maintain a uniform thickness of the bed due to non-ideal characteristics and possible deformations of the grids that could lead to preferential pathways in the zones where the screen thickness is less.

To overcome these drawbacks, one solution consists in reversing the flow direction of the gases and also the distribution of the adsorbents, so that the adsorbent A is between the inner grid and the intermediate grid and the adsorbent B is between the intermediate grid and the outer grid. With a flow of the gas from the inside toward the outside of the vessel in the adsorption phase, the adsorber is therefore in "centrifugal radial" configuration (FIG. 1).

However, this centrifugal configuration may prove less energy-efficient than the centripetal solution. Mention will be made, for example, of the case of the $O_2$ VSA process where this centrifugal configuration substantially increases the pressure drops and is consequently detrimental to the specific energy of the process, and also the case of TSA processes where the regeneration from the outside to the inside will increase the heat losses.

$O_2$ VSA processes conventionally consist of two beds, the first being a low-volume layer of alumina (silica gel or certain zeolites are also used alone or in combination), the objective of which is to stop the water contained in the feed air and the second is a zeolite layer that selectively retains nitrogen with respect to oxygen.

One geometry that makes it possible to retain the centripetal configuration, referred to as the "mushroom" configuration, has been used for these $O_2$ VSA processes. It consisted in installing in the bottom of the adsorber a layer of granulated alumina held between two grids with a radial circulation of the fluid, or more simply positioned in axial configuration. Although this solution makes it possible to retain a centripetal radial configuration for the zeolite, it nevertheless substantially complicates the construction and leads to a significant additional cost.

Also added to these hydrodynamic problems are drawbacks linked to the presence of several selective adsorbents. To mention the case of the $O_2$ VSA process, the use of alumina in granular form, which as described above has the role of dehumidifying the gas to be treated, today limits the performance levels, in particular the specific energy and the productivity, of such processes. Specifically, the addition of an alumina layer to the adsorber substantially increases the dead volumes and also the pressure drops. Lastly, alumina, due to its physical properties, acts as a thermal insulator/accumulator leading to the storage of frigories at the interface with the screen, a phenomenon that is substantially detrimental to the specific energy of the system. Decoupling the alumina from one or more other adsorbents used would thus make it possible to benefit from significant savings in the pumping energy.

Starting from there, one problem that is faced is to provide a novel configuration that makes it possible to overcome all these drawbacks.

SUMMARY

One solution of the present invention is a (V)PSA-type adsorption unit for purifying a gas stream successively comprising, in the flow direction of the feed gas stream:
- a rotary structured adsorbent wheel configured so as to drive the gas stream therethrough in an axial manner and that makes it possible to dry the feed gas to a level corresponding to a dew point below −30° C., (that will then be described as a "dry" stream); and
- an adsorber of centripetal radial configuration comprising a bed of particulate adsorbent.

The expression "particulate adsorbent material" is understood to mean an adsorbent that is in the form grains, beads, rods, etc. of millimeter size, generally having an equivalent diameter (diameter equivalent to the sphere of the same volume) in the range extending from 0.5 to 5 mm.

The expression "structured adsorbent" is understood to mean solid materials having a size ranging from a few centimeters to a few meters and having passages open to the gas, such as monoliths, foams or fabrics. The structured adsorbents have (compared to granulated adsorbents) the distinctive feature of enabling very good kinetics and very low pressure drops without exhibiting a known attrition limit. Although these structures are today much more expensive than granulated adsorbents, their economic advantage for complete replacement of the granulated beds may prove decisive if it is accompanied by a sizeable pressure drop saving and/or a significant reduction in the cost of constructing the adsorber via a decrease in the volume of adsorbent or a simplification of the construction.

The structured adsorbent preferably used is a parallel-passage contactor. The expression "parallel-passage contactor" is understood to mean a device in which the fluid passes into channels the walls of which contain the adsorbent. The fluid circulates in channels that are essentially free of obstacles, these channels enabling the fluid to circulate from an inlet to an outlet of the contactor. These channels may be rectilinear, directly connecting the inlet to the outlet of the contactor or may have changes of direction. The fluid, during the circulation thereof, is in contact with at least one adsorbent present on said walls.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Depending on the case, the unit according to the invention may have one or more of the following features:
- the adsorbent wheel comprises at least one zone dedicated to adsorption and at least one zone dedicated to regeneration;
- the zone dedicated to regeneration comprises at least a first part subjected to a hot stream, i.e. at a temperature above the temperature of the feed stream, preferentially at least 20° C. above the temperature of the feed stream; and a second part subjected to a stream (cold stream) at a temperature below the temperature of the stream (hot stream) to which the first part is subjected, preferentially at the temperature of the feed stream plus or minus 10 degrees Celsius;
- the adsorber consists of a cylindrical shell and two end walls and the bed of particulate adsorbent is held in place by means of two perforated grids positioned concentrically;
- the ratio of the volume of particulate adsorbent to the volume of structured adsorbent is between 2 and 100;
- the particulate adsorbent comprises beads of alumina, of silica gel, of activated carbon, of MOF or of type A, X or Y zeolites;
- the structured adsorbent comprises channels, the walls of which contain an adsorbent;
- the adsorbent contained in the walls of the channels is selected from alumina, silica gel, activated carbon, or type A, X or Y zeolites.

Another subject of the present invention is an adsorption process for purifying a gas stream using a purification unit according to the invention, wherein the adsorbent wheel follows a pressure cycle comprising an adsorption step and a regeneration step and a rotation of the adsorbent wheel is carried out at the end of each adsorption step.

Depending on the case, the process according to the invention may have one or more of the features below:
- the adsorbent wheel comprises at least one zone dedicated to adsorption and at least one zone dedicated to regeneration, the zone dedicated to adsorption receives the feed gas stream, the zone dedicated to regeneration receives a regeneration gas stream, and, in a continuous manner, the zone dedicated to adsorption becomes the zone dedicated to regeneration and conversely the zone dedicated to regeneration becomes the zone dedicated to adsorption by rotation of the adsorbent wheel;
- at the outlet of the adsorber of centripetal radial configuration, a purified stream and a residual stream are recovered;
- the purified stream or the residual stream is used as regeneration stream for the adsorber of centripetal radial configuration;
- said process is an $O_2$ VSA process;
- said process treats an air flow rate of at least 10 000 $Nm^3/h$.

Figure 3:
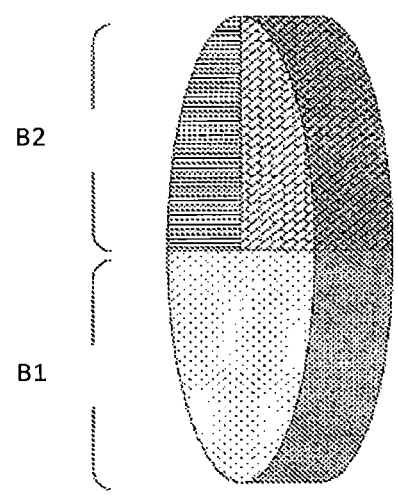
FIG. 3 illustrates the structured adsorbent in the form of a wheel, having at least one zone dedicated to the adsorption phase B1 and at least one zone dedicated to the regeneration phase B2, in accordance with one embodiment of the present invention.

The structured adsorbent preferentially used is in the form of a wheel thus enabling it to be shared by several dedicated zones. The term "zone" is understood to mean at least one zone dedicated to the adsorption phase B1 and at least one zone dedicated to the regeneration phase B2 (FIG. 3).

Figure 1:
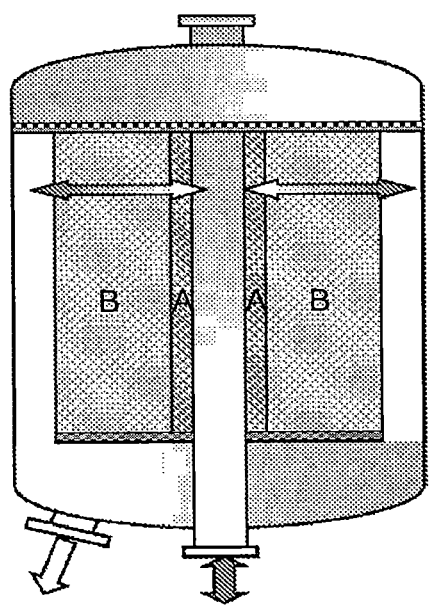
FIG. 1 illustrates an adsorber with adsorbent A in between the inner grid and the intermediate grid and adsorbent B in between the intermediate grid and the outer grid, as known to the prior art.
Figure 2:
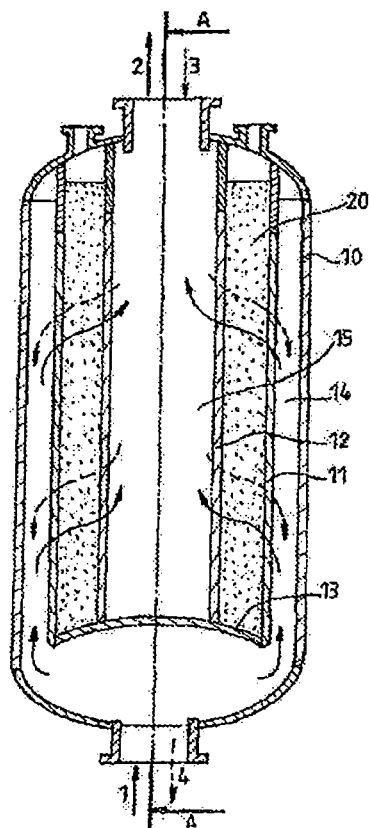
FIG. 2 illustrates a centripetal radial adsorber having a single selective adsorbent, in accordance with one embodiment of the present invention.

The operation of a centripetal radial adsorber having only a single selective adsorbent is represented in FIG. 2. The fluid 1 to be purified or to be separated enters in the bottom part of the radial adsorber 10, passes through the adsorbent mass 20 and the product leaves from the upper part 2. During the regeneration, the regeneration fluid 3 enters countercurrently via the top part, desorbs the impurities contained in the adsorbent mass 20 and the residual gas 4 leaves from the bottom part. The adsorber 10 itself consists of a cylindrical shell of vertical axis AA and of two end walls. The adsorbent mass is held in place by means of a perforated outer grid 11 and a likewise perforated inner grid 12 that are fastened to the upper end wall, and by means of a solid metal sheet 13 in the lower part. The gas 1 circulates vertically at the periphery in the outer free zone 14 between the cylindrical shell and the outer grid, passes radially through the adsorbent mass 20 then circulates vertically in the inner free zone 15 before leaving the adsorber via the top. The regeneration is carried out in the reverse direction.

Figure 4:
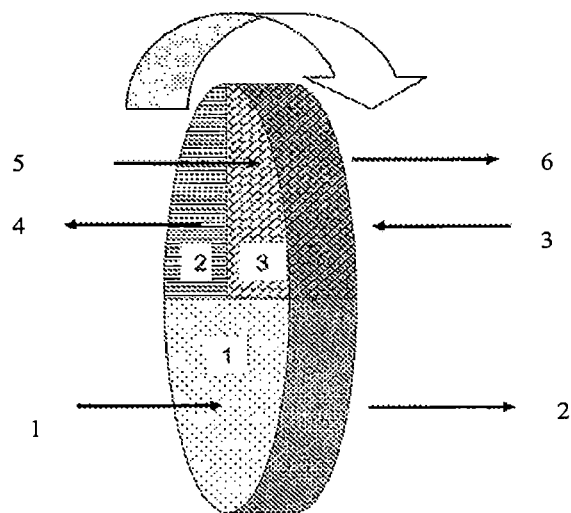
FIG. 4 illustrates the operation of the rotary adsorbent wheel having several dedicated sectors, in accordance with one embodiment of the present invention.

The operation of a "rotary" wheel having several dedicated sectors is represented in FIG. 4. The feed gas stream to be dried or to be separated 1 enters in the bottom portion of the wheel A via the zone 1, the dry product then exits at 2. The regeneration is carried out in the reverse direction, the hot stream arrives at 3, passes through the wheel A via the zone 2; the stream, then loaded with impurities, exits at 4. An optional zone 3 may be used for the complete regeneration of the wheel A and for preparing as well as possible the next adsorption phase, the cold stream used enters at 5 and exits from the sector 3 at 6. It is noted that it is preferable to cool the adsorbent mass before changing to adsorption in order to avoid disrupting the process downstream and more simply because if the adsorbent mass is hot, it does not adsorb very much. This stream must imperatively be dry, that is to say with a dew point below −30° C.

In the case of an $O_2$ VSA process, the provision of the air stream and the regeneration of adsorbent volume are carried out by rotating machines, usually of volumetric type. Conventionally, use is made of machines of Roots technology, both for blowing/compressing the incoming air and for purging the adsorber, respectively referred to as "blower" and "vacuum pump". The present invention leans toward a vacuum pump technology that makes it possible to provide a dry gas or optionally a gas with low hygrometry at a temperature above 80° C. or toward the final oxygen compressor that makes it possible to provide a dry and hot gas.

Figure 5:
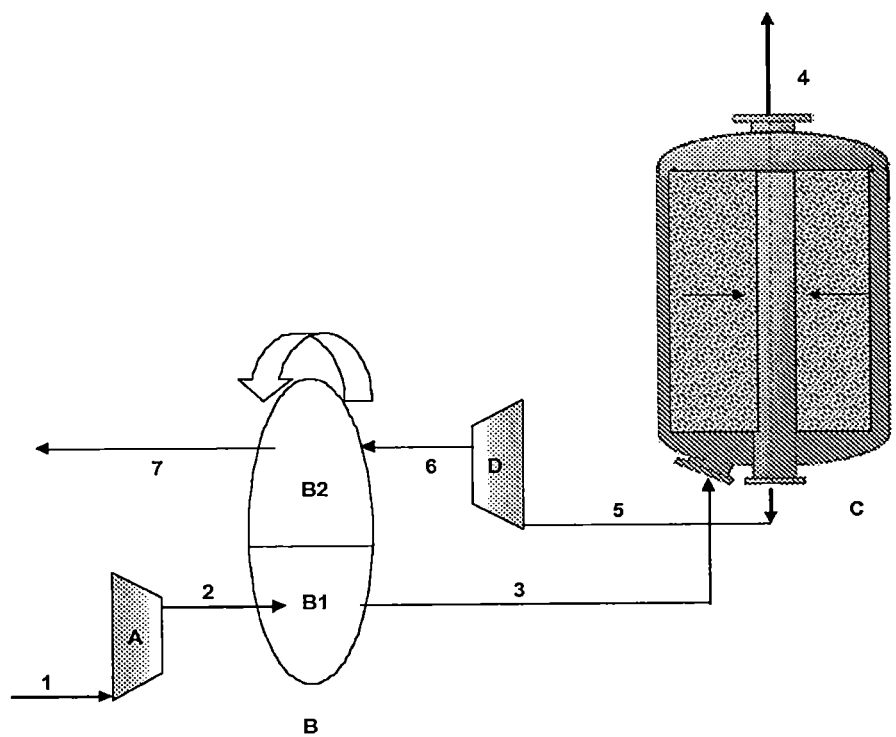
FIG. 5 illustrates the coupled operation of a radial adsorber and the adsorbent wheel, in accordance with one embodiment of the present invention.

The coupled operation of said radial adsorber and of said wheel is represented in FIG. 5. The fluid 1 to be purified or to be separated is compressed via a rotating machine A generally of blowing type, then is sent to the wheel B via the stream 2. The stream 2 passes through the adsorbent mass of the wheel B, via the zone dedicated to purification B1. Thus, the purified stream 3 is sent to the radial adsorber. The final product leaves the adsorber C in centripetal circulation via the stream 4. The regeneration is carried out in the reverse direction, the impurities are desorbed by means of the rotating machine D, generally of vacuum pump type, via the stream 5. The stream of impurities 6 heated by the operation of the rotating machine D enters the regeneration sector B2 of said desiccant wheel B. The stream 7 containing the impurities of said radial adsorber C and of said wheel B is sent to a vent.

Figure 6:
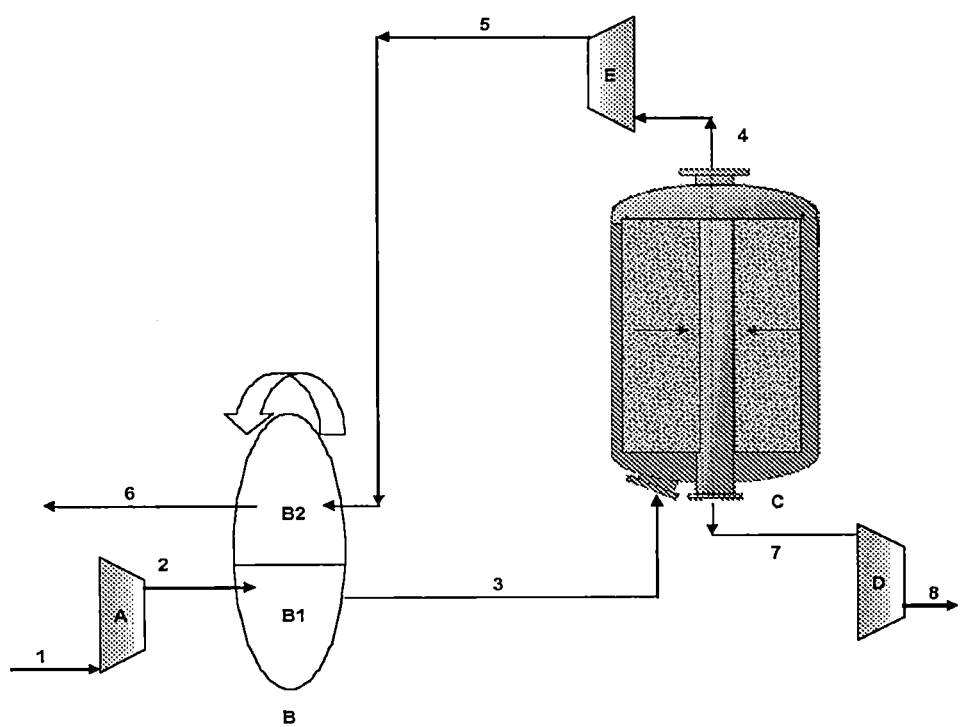
FIG. 6 illustrates another operating diagram, in accordance with one embodiment of the present invention.

Another possible operating diagram is presented in FIG. 6. The general operation of the process presented is analogous to that of FIG. 5. The regeneration of the desiccant wheel B, via the zone B2 is this time carried out by means of the dry and hot stream 5 originating from the final product compressor E. The stream 6 then contains the upgradable product and also the impurities contained in the desiccant wheel B.

Figure 7:
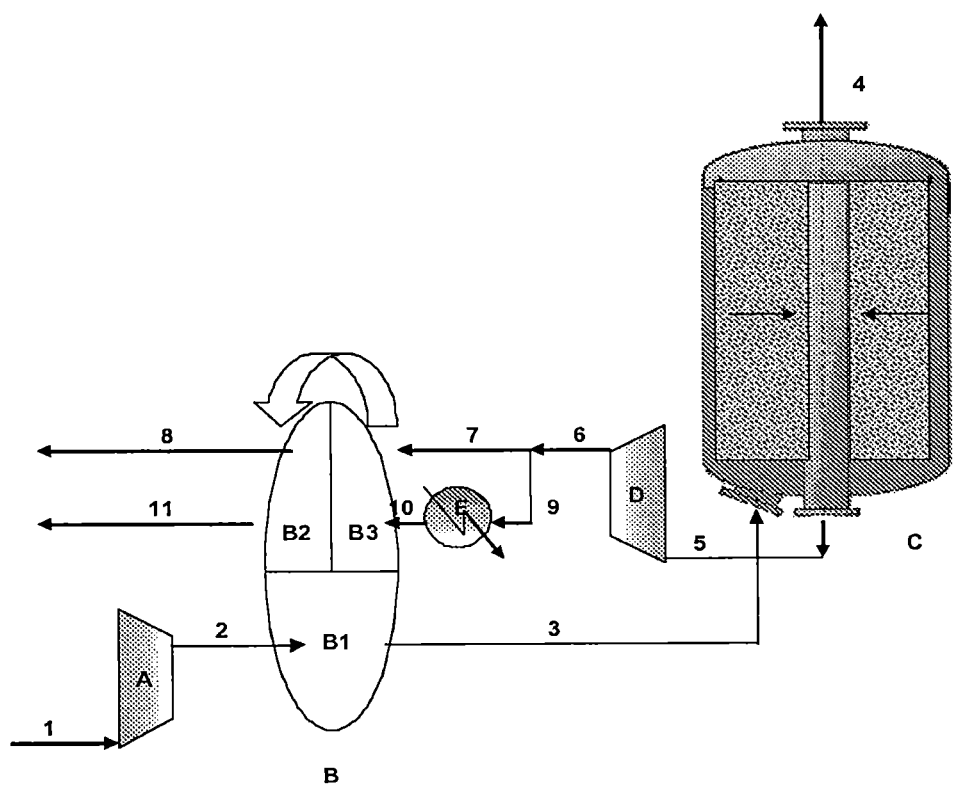
FIG. 7 illustrates a wheel with a third zone, in accordance with one embodiment of the present invention.

Finally, an optional third zone may be used for the desiccant wheel. FIG. 7 proposes an illustration of this operating mode. Thus, an optional cooling of the regeneration zone of the desiccant wheel B, in particular by the use of a zone B3 may be carried out via the stream 10 precooled by means of the installation of a cold circuit E at the outlet of the rotating machine D. This optional cooling makes it possible to complete the regeneration of the desiccant wheel B and to prepare as well as possible the zone B1 dedicated to the adsorption phase.

The use of a cold circuit via a heat exchanger located between the desiccant wheel and the vacuum pump is optional.

The rotational speed and cycle of the desiccant wheel are linked to the operating cycle of the (V)PSA process.

An adsorption process according to the invention has the following advantages:

- it makes it possible to change from a centrifugal configuration to a more energy-efficient centripetal configuration;
- it makes it possible to do without a grid in the radial part which significantly simplifies the construction of the adsorbers and leads directly to a decrease in the cost of this adsorber;
- it enables a reduction in the dead volume on the feed side that is generally damaging to the performance levels of (V)PSA processes;
- it makes it possible to overcome the problem of storage of frigories caused by alumina (or its equivalent);
- it enables an energy integration, in particular by benefiting from the discharge heat of the vacuum pump (or of the final product compressor optionally installed) for the regeneration of said desiccant wheel.

The unit according to the invention presented may be used in various PSA processes such as $H_2$ PSA processes that have to produce high-purity hydrogen, and $CO_2$ PSA and $O_2$ PSA processes, etc. It may also be used for drying, decarbonating or stopping secondary impurities of a gas stream, especially derived from atmospheric air. The expression "secondary impurities" is understood to mean traces of hydrocarbons, NOx, Sox, etc.

Finally, the adsorber according to the invention may be used in $O_2$ VSA processes that make it possible to treat an air flow rate ranging from one thousand to more than 40 000 $Nm^3/h$, or even more than 60 000 $Nm^3/h$.

By way of example, $O_2$ VSA processes of large size (that make it possible to produce more than 30 tonnes/day of oxygen having a standard purity of greater than 90%) exhibit an economic advantage in being radial and of centrifugal configuration in order to preserve a sufficiently large alumina thickness.

For the case of the $O_2$ VSA process, one solution according to the invention that makes it possible to have a coupled centripetal radial configuration would be the following:

- a rotary wheel of structured adsorbent comprising alumina or silica gel creating little pressure drop and lowering the dew point of the feed gas to a temperature below −30° C., and through which the gas would circulate axially; and
- a bed of particulate adsorbent composed of the granulated LiLSX screen, intended to separate oxygen from nitrogen and positioned conventionally between 2 concentric grids in said centripetal adsorber, and the hot residual gas of which is used for regenerating the downstream rotary unit.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A (V)PSA-type adsorption unit for purifying a gas stream, successively comprising, in the flow direction of the feed gas stream:
    a rotary structured adsorbent wheel configured to drive the gas stream therethrough in an axial manner and configured to dry the feed gas to a level corresponding to a dew point below −30° C., the adsorbent wheel comprising at least one zone dedicated to adsorption and at least one zone dedicated to regeneration; and
an adsorber of centripetal radial configuration comprising a bed of particulate adsorbent.

2. The purification unit of claim 1, wherein the zone dedicated to regeneration comprises at least a first part subjected to a stream having a temperature above the temperature of the feed stream, and at least a second part subjected to a stream having a temperature below the temperature of the stream to which the first part is subjected.

3. The purification unit of claim 1, wherein the adsorber comprises a cylindrical shell and two end walls and the bed of particulate adsorbent is held in place by means of two perforated grids positioned concentrically.

4. The purification unit of claim 1, wherein the ratio of the volume of particulate adsorbent to the volume of structured adsorbent is between 2 and 100.

5. The purification unit of claim 1, wherein the particulate adsorbent comprises beads of alumina, of silica gel, of activated carbon, of MOF or of type A, X or Y zeolites.

6. The purification unit of claim 1, wherein the structured adsorbent comprises channels, the walls of which contain an adsorbent.

7. The purification unit of claim 6, wherein the adsorbent contained in the walls of the channels is selected from alumina, silica gel, activated carbon, or type A, X or Y zeolites.

8. An adsorption process for purifying a gas stream using a purification unit as claimed in claim 1, wherein the adsorbent wheel follows a pressure cycle comprising an adsorption step and a regeneration step and a rotation of the adsorbent wheel is carried out at the end of each adsorption step.

9. The purification process of claim 8, wherein:
the adsorbent wheel comprises at least one zone dedicated to adsorption and at least one zone dedicated to regeneration,
the zone dedicated to adsorption receives the feed gas stream,
the zone dedicated to regeneration receives a regeneration gas stream, and
in a continuous manner, the zone dedicated to adsorption becomes the zone dedicated to regeneration and conversely the zone dedicated to regeneration becomes the zone dedicated to adsorption by rotation of the adsorbent wheel.

10. The purification process of claim 8, wherein, at the outlet of the adsorber of centripetal radial configuration, a purified stream and a residual stream are recovered.

11. The purification process of claim 10, wherein the purified stream or the residual stream is used as regeneration stream for the adsorber of centripetal radial configuration.

12. The purification process of claim 9, wherein the process is a O2 VSA process.

13. The purification process of claim 12, wherein the process treats an air flow rate of at least 10 000 $Nm^3/h$.

* * * * *